Patented May 22, 1923.

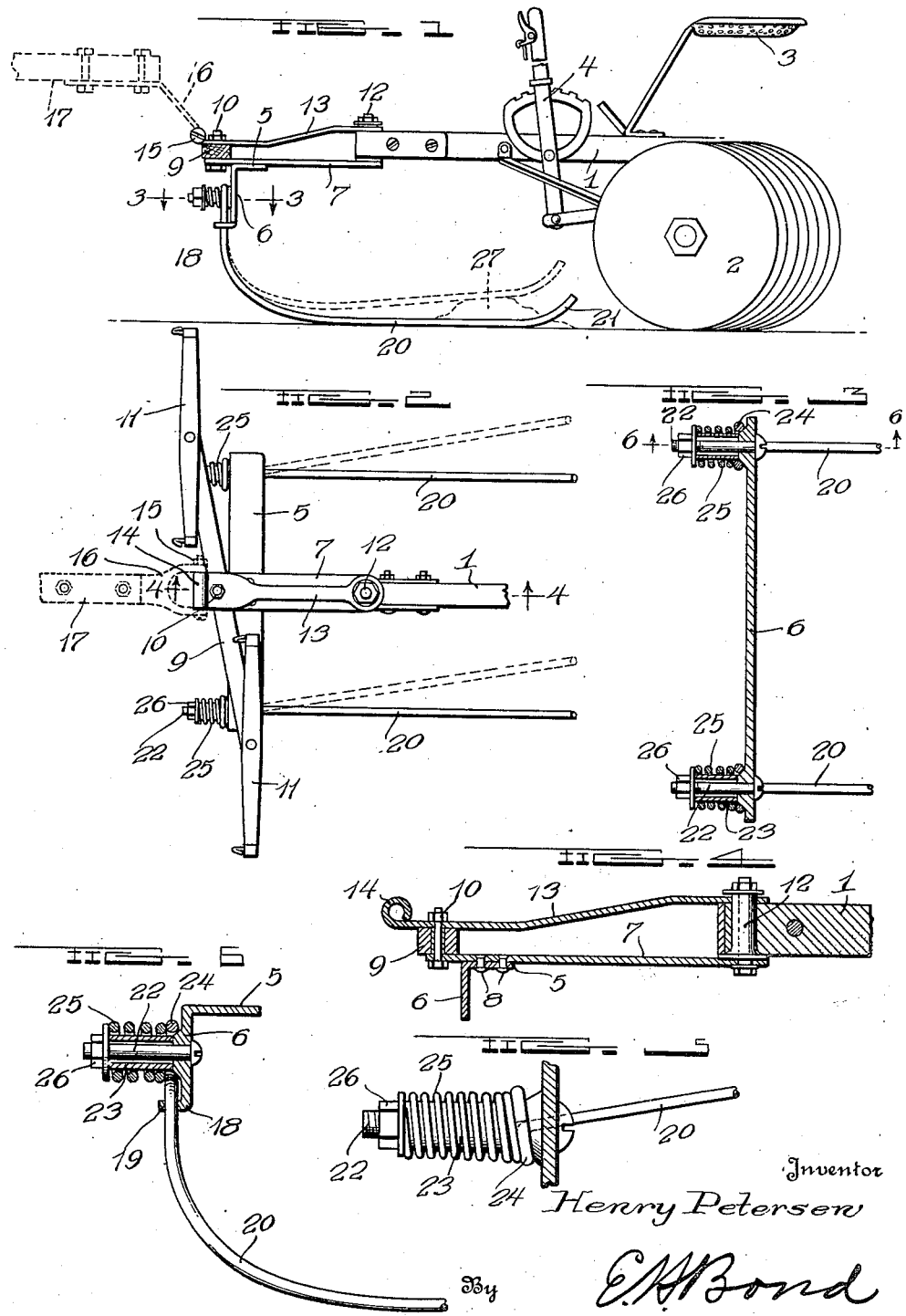

1,456,253

UNITED STATES PATENT OFFICE.

HENRY PETERSEN, OF MOUNT AUBURN, IOWA.

SPRING SUPPORT FOR HARROWS, ETC.

Application filed April 20, 1922. Serial No. 555,718.

*To all whom it may concern:*

Be it known that I, HENRY PETERSEN, a citizen of the United States, residing at Mount Auburn, in the county of Benton and State of Iowa, have invented certain new and useful Improvements in Spring Support for Harrows, Etc., of which the following is a specification.

This invention relates to certain new and useful improvements in agricultural implements, and more particularly to the means for supporting the earth working devices, such as disks. In lieu of the wheeled truck generally employed for this purpose I provide a skid or yielding support which overcomes the objections to the wheeled truck in that it provides for ready yielding of the support when meeting obstructions and the like and hence makes the device less liable to shocks and jouncing of the driver which is unavoidable with the use of a wheeled truck. Turning of the implement is made much easier, it draws easier and rides easier, in addition to the saving in expense of manufacture, and the improvements forming the subject matter of this application are not liable to get out of order, together with reliability and readiness of application.

Other objects and advantages of the invention will hereinafter appear and the novel features thereof will be specifically defined by the appended claims.

The invention, in its preferred form, is clearly illustrated in the accompanying drawings, which, with the numerals of reference marked thereon, form a part of this specification, and in which—

Figure 1 is a side elevation illustrating my present improvement.

Figure 2 is a top plan thereof.

Figure 3 is a section on the line 3—3 of Figure 1, looking in the direction of the arrows.

Figure 4 is a section on the line 4—4 of Figure 2.

Figure 5 is an enlarged detail with a part in section and a portion broken away, showing the means of mounting the end of the spring skid and its backing spring.

Figure 6 is an enlarged section on the line 6—6 of Figure 3, looking in the direction of the arrows.

Like numerals of reference indicate like parts throughout the several views.

Referring to the drawings—

1 designates the tongue which in this instance is shown as carrying the disks 2 of known construction, the member 1 being what is known as a "short tongue," but this, as well as the disks, the seat 3 and the lever 4 may be of any well known construction, and in lieu of disks the tongue may carry any other form of earth working devices.

My present improvement is pivotally supported from the forward end of the tongue 1. The structural features may be varied within wide limits and the form now to be described is to be taken as one merely noted for the purpose of illustration, without restricting the invention to such particular form of construction.

5 is a transverse member having depending portion 6 which may extend throughout the length of said member, or may exist at the ends only. This member is pivotally supported from the forward end of the tongue 1 in any suitable manner; in the present instance I have shown it as carried by a longitudinal member 7 which may or may not be integral with the member 5, but in the present instance shown as formed separately therefrom, and affixed thereto by rivets or the like 8, in Figure 4, and upon its forward end is designed to be supported the double-tree 9, pivotally mounted on the vertical pivot 10, and carrying the single trees 11 as seen in Figure 2. The member 7 is pivotally mounted on the vertical pivot 12 supported in the forward end of the tongue 1 and 13 is a strap also mounted on the pivot 12 upon the top of the tongue 1 while its forward end is extended and provided with a turned over portion 14 which is adapted to receive the pin or bolt 15 of the connection between the said strap and the inclined strap 16 which is inclined upwardly so that the tongue 17 will clear the double tree, the tongue 17 being provided in the usual way for the attachment of the draft animals.

The depending portion 6 of the member 5 is provided near each end with a lateral member 18 having a hole 19 through which passes the spring member 20, of which there may be one or more, in the present instance two being shown, one near each end of the member 5. The spring member is preferably of round material of sufficient diameter and is curved downward and rearward from its passage through the opening in the member 18 as shown, the free end being upturned as sene at 21 to prevent its entering endwise into the earth, the member 20 being substantially parallel with the beam or tongue 1 where contacting with the ground as will be readily seen in Figure 1.

22 is a bolt passed through the depending portion 6 and through a bushing 23 which may or may not be integral with the said depending portion, and about this bushing the forward end of the member 20 is circled as seen at 24, while upon this bushing is placed the coiled spring 25 which is tensioned by a nut 26 on the bolt 11. If but one runner or member 20 is employed it should be arranged centrally of the device. Two are preferable.

In use, should the runner 20 meet with an obstruction as seen by dotted lines at 27 the runner will yield, either laterally or vertically, the two runners being yieldable independently of each other and thus all jarring or jolting of the rider will be avoided. The runners support the tongue 1 and the disks yieldingly and the friction is small. The springs 25 back up the spring of the members 20 and assist in holding the latter in their proper operative position, yet allowing of yielding thereof when necessary.

Modifications in detail may be resorted to without departing from the spirit of the invention or sacrificing any of its advantages.

What is claimed as new is:—

1. In an agricultural implement, a spring-supported resilient wheelless support for the forward end of the implement-carrying member.

2. In an agricultural implement, a tongue for supporting the earth working devices, and a support for the forward end of said tongue, consisting of a resilient member having one end free and the other end yieldingly mounted.

3. In an agricultural implement, a tongue for supporting the earth working devices, a spring runner free at its rear end and having its forward end yieldingly mounted, and a spring for tensioning said runner.

4. In an agricultural implement, a tongue, a frame at the forward end thereof, a spring runner supported by the forward end of said frame, and a tongue connected with the forward end of said frame.

5. In an agricultural implement, a tongue for supporting the earth working devices, a frame supported by the forward end of the said tongue, and a pair of independently yieldable spring runners supported from said frame.

6. In an agricultural implement, a tongue, a frame supported at the forward end thereof, a pair of independently yieldable spring runners supported from said frame, and means for tensioning said runners.

7. An attachment to a tongue of an agricultural implement, the same comprising a frame with means for attachment to the said tongue, and independently mounted spring runners on said frame free for movement both vertically and laterally.

8. An attachment to the tongue of an agricultural implement, the same comprising a frame with attaching means, spring runners supported from said frame with their rear ends free and yieldable laterally and vertically, and tensioning means for said runners.

9. In an agricultural implement, a tongue, a frame carried by the forward end thereof and having depending portion, a spring runner supported by said frame, a coiled spring bearing against the said runner, and means for tensioning said spring, said coiled spring and means being supported by said frame.

10. In an agricultural implement, a frame attachable to the tongue of the implement, and having a depending portion with lateral lug with opening, a bushing and bolt therein supported from said depending portion, a spring runner passed through said opening and having one end coiled about said bushing and its other end free, and a spring surrounding said bushing and bearing against the coil of the spring runner, and a nut on said bolt bearing against said spring.

In testimony whereof I affix my signature.

HENRY PETERSEN.